United States Patent
Smithies et al.

(10) Patent No.: US 6,872,233 B2
(45) Date of Patent: Mar. 29, 2005

(54) HIGH EFFICIENCY PARTICULATE AIR RATED VACUUM BAG MEDIA AND AN ASSOCIATED METHOD OF PRODUCTION

(75) Inventors: Alan Smithies, Overland Park, KS (US); William C. Zimmerman, Overland Park, KS (US)

(73) Assignee: BHA Technologies, Inc., Kansas City, MO (US)

( * ) Notice: Subject to any disclaimer, the term of this patent is extended or adjusted under 35 U.S.C. 154(b) by 47 days.

(21) Appl. No.: 10/062,063

(22) Filed: Jan. 31, 2002

(65) Prior Publication Data

US 2003/0140606 A1 Jul. 31, 2003

(51) Int. Cl.$^7$ .............................................. B01D 29/11
(52) U.S. Cl. .......................... 55/486; 55/587; 55/382; 55/DIG. 2; 55/DIG. 5; 15/347; 96/66; 96/68; 264/258; 264/DIG. 48; 442/389
(58) Field of Search ......................... 55/486, 487, 382, 55/DIG. 2, DIG. 5, 485, 528; 15/347; 96/66, 68; 264/258, DIG. 48; 442/389

(56) References Cited

U.S. PATENT DOCUMENTS

| | | |
|---|---|---|
| 4,116,648 A | 9/1978 | Busch |
| 4,155,727 A | 5/1979 | Kaulig |
| 4,378,207 A | 3/1983 | Smith |
| 4,589,894 A | 5/1986 | Gin et al. |
| 4,605,366 A | 8/1986 | Lehmann et al. |
| 4,812,284 A | 3/1989 | Fleissner |
| 4,877,433 A | 10/1989 | Oshitari |
| 4,902,423 A | 2/1990 | Bacino |
| 4,925,601 A | 5/1990 | Vogt et al. |
| 5,098,777 A | 3/1992 | Koli |
| 5,216,790 A | 6/1993 | Eschenbach |
| 5,244,703 A | 9/1993 | Bosses |
| 5,259,854 A * | 11/1993 | Newman ...................... 55/320 |
| 5,370,756 A | 12/1994 | Buis et al. |
| 5,404,626 A | 4/1995 | Bylund et al. |
| 5,425,162 A | 6/1995 | Buis et al. |
| 5,507,847 A | 4/1996 | George et al. |
| 5,591,526 A | 1/1997 | Abrams et al. |
| 5,635,124 A | 6/1997 | Abrams et al. |
| 5,814,569 A | 9/1998 | Suzuki et al. |
| 5,837,102 A | 11/1998 | Graf |
| 6,110,249 A | 8/2000 | Medcalf et al. |
| 6,171,369 B1 | 1/2001 | Schultink et al. |
| 6,183,536 B1 | 2/2001 | Schultink et al. |
| 6,228,477 B1 | 5/2001 | Klare et al. |
| 6,325,127 B1 | 12/2001 | Waldrop |
| 5,372,004 A1 | 4/2002 | Schultink et al. |
| 6,372,004 B1 | 4/2002 | Schultink et al. |
| 6,409,785 B1 | 6/2002 | Smithies et al. |
| 6,409,787 B1 | 6/2002 | Smithies et al. |
| 2001/0047721 A1 | 12/2001 | Scanlon |

\* cited by examiner

*Primary Examiner*—Minh-Chau T. Pham
(74) *Attorney, Agent, or Firm*—Blackwell Sanders Peper Martin LLP

(57) ABSTRACT

A vacuum bag media and associated method of production, which includes a first layer that includes an expanded polytetrafluoroethylene membrane and at least one second layer that includes a first component having a first melting point and a second component having a second melting point that is higher than the first melting point, wherein the first layer is attached to the at least one second layer. The second layer can include cellulose material, spunbond, nonwoven fabric, and a thermal bond, nonwoven fabric. Attachment of the first layer of material to the at least one second layer of material can occur through thermobonding, e.g., heated gas, infrared heat and heated calender rolls. The application of adhesives and the use of ultrasonic energy can also bond the layers together. Approximately five percent (5%) to fifty percent (50%) of the first component can be selectively melted for superior airflow. Fibers with sheath and core portions may be utilized for the first component and the second component, respectively.

35 Claims, 11 Drawing Sheets

Fig_1_

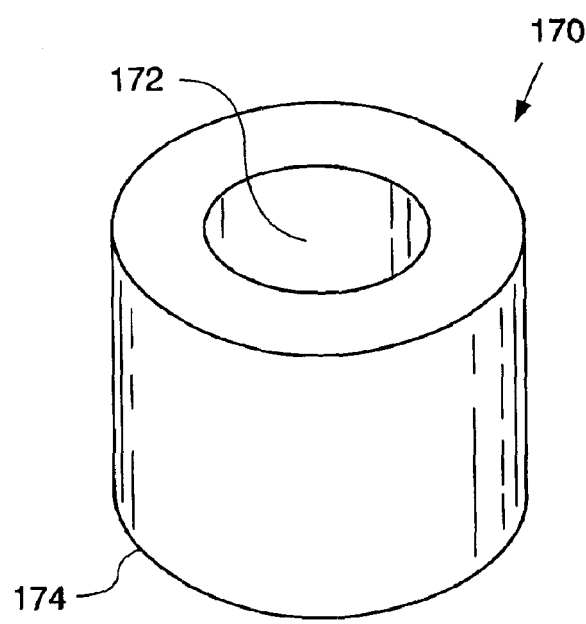
Fig-4-
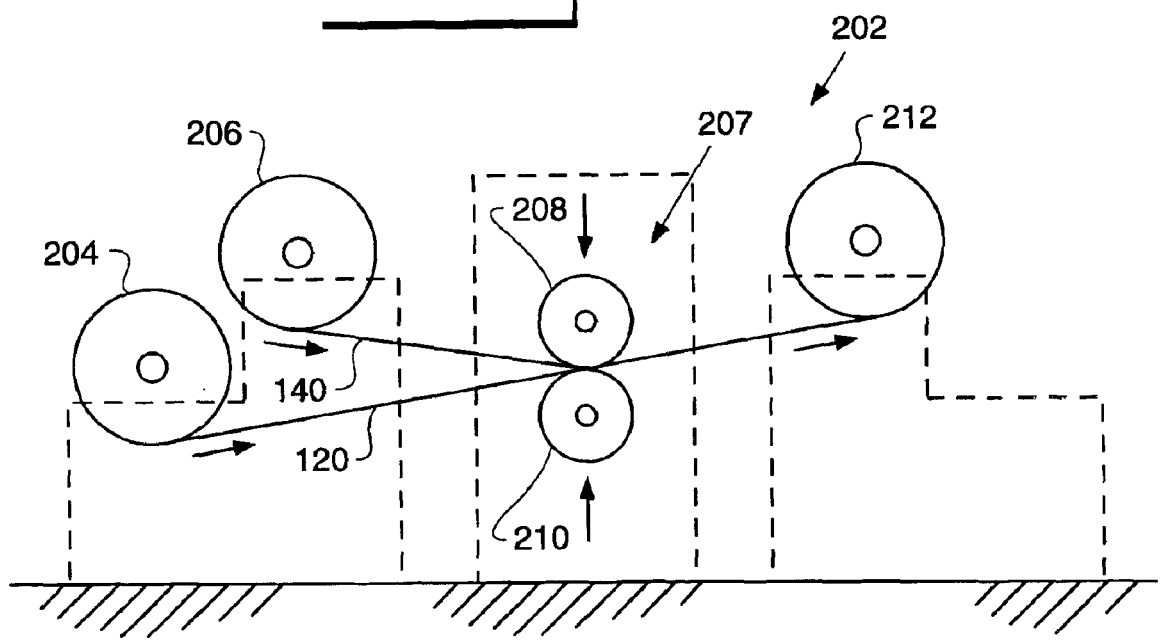
Fig-5-

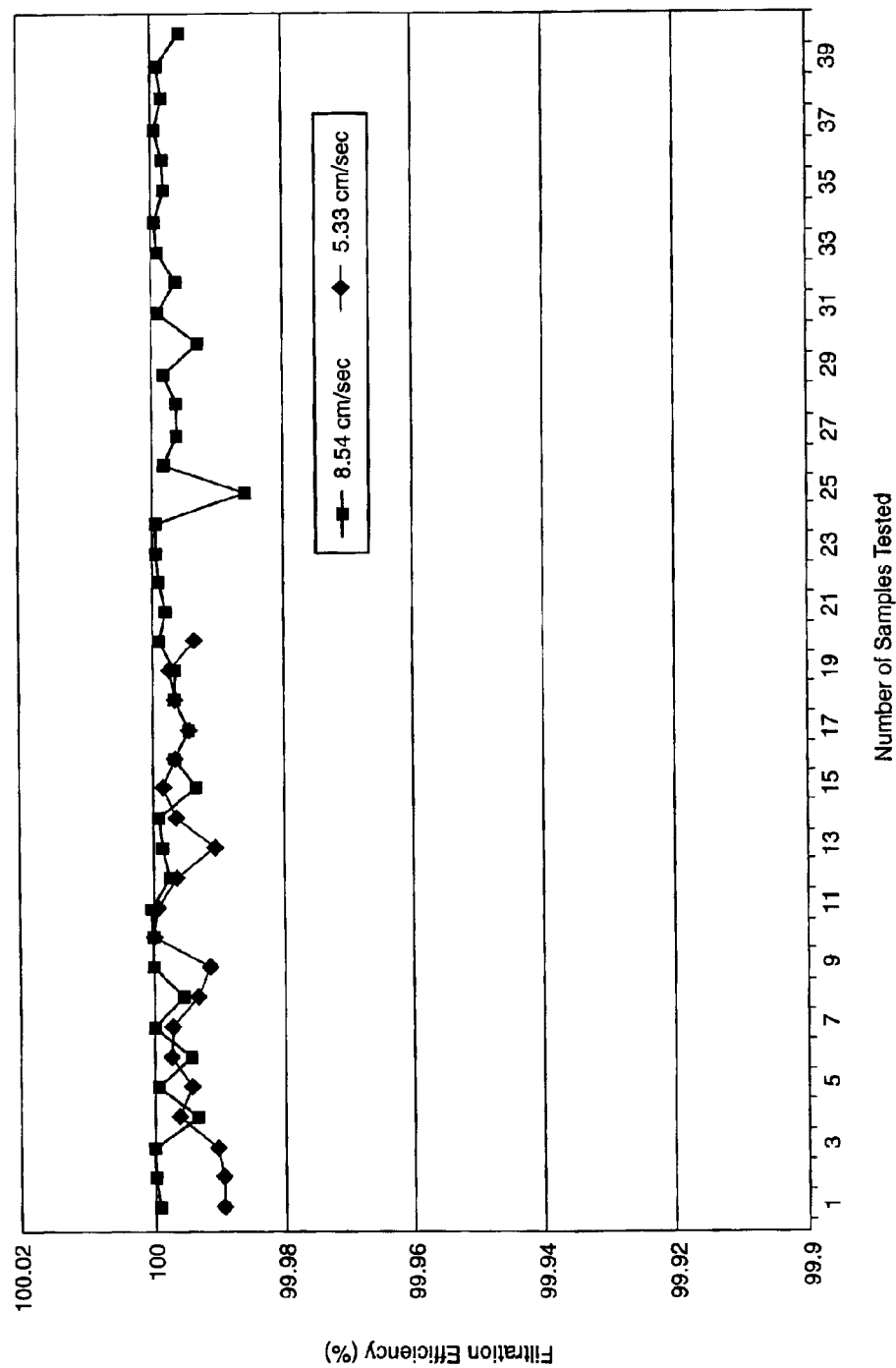

Fig_10_
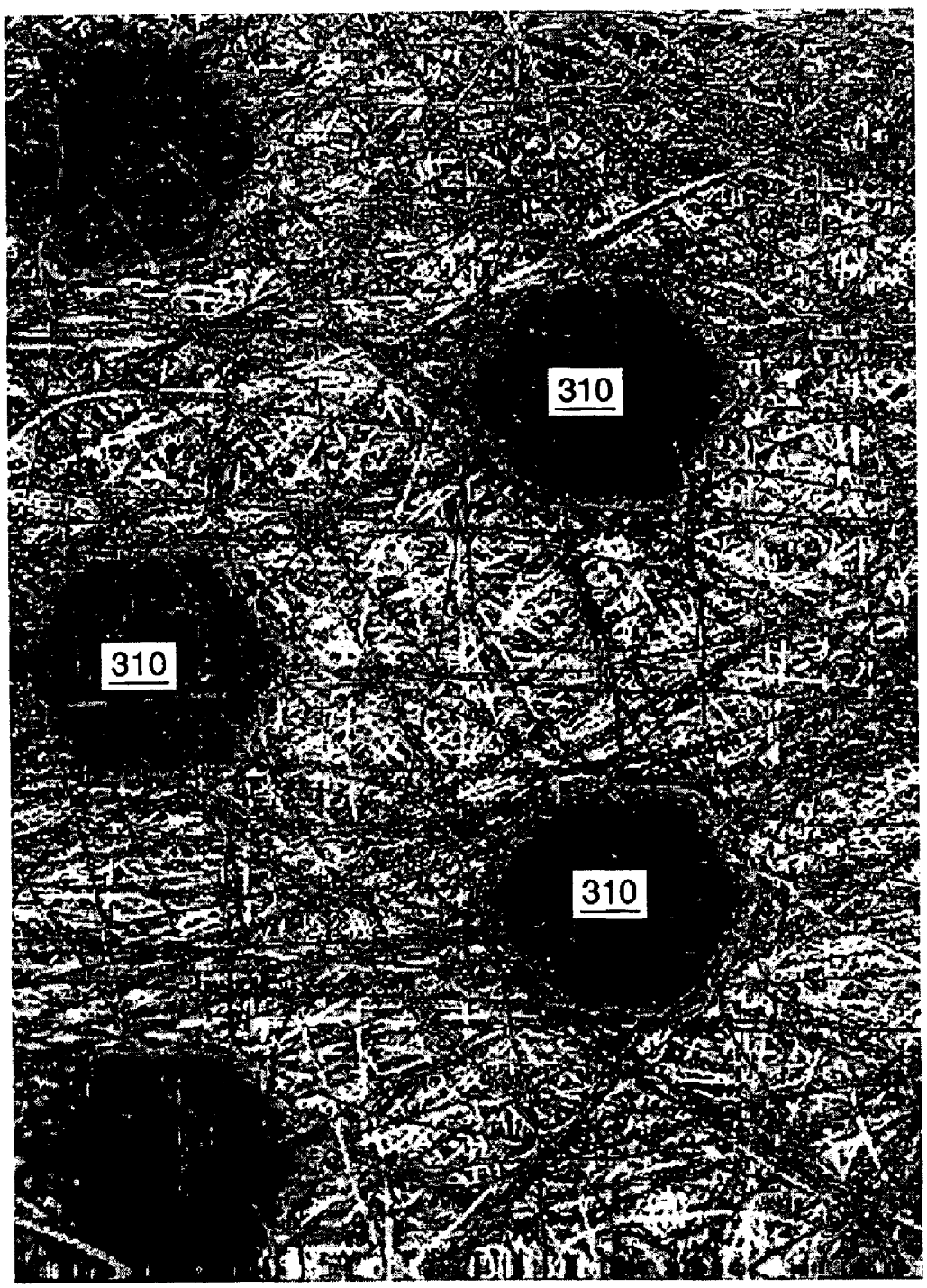

HIGH EFFICIENCY PARTICULATE AIR RATED VACUUM BAG MEDIA AND AN ASSOCIATED METHOD OF PRODUCTION

FIELD OF THE INVENTION

This invention relates to vacuum bag media, and more particularly, to an improved vacuum bag media that is high efficiency particulate air (HEPA) rated and an associated method of production.

BACKGROUND OF THE INVENTION

Traditional vacuum cleaner bags are produced from specific types of cellulose paper or combined laminates of cellulose paper and polypropylene meltblown nonwoven media as well as a one hundred percent (100%) synthetic fiber products that include spunbond, nonwoven fibers and meltblown, nonwoven fibers. However, customers are demanding more of their vacuum cleaner technology and desire much higher levels of filtration so that dust and other particulate matter are not picked-up by the vacuum cleaner and then transferred into the air right through the standard, low efficiency, vacuum cleaner bag under the high pressure suction of the vacuum cleaner. With this traditional vacuum cleaner bag technology, although the visible dirt and debris will no longer be present on the carpeting, the fine dust and particles will be projected into the surrounding atmosphere of the room and potentially inhaled by the occupants. For the significant portion of the population that is plagued by allergies, this can be especially problematic. This projected dust and debris will eventually settle, which will then require dusting or additionally vacuuming for removal. With the low efficiency rating present for a standard vacuum cleaner bag, a significant portion of the dust and debris is constantly being recirculated during each operation of the vacuum cleaner.

Therefore, the trend is for consumers to utilize a HEPA rated bagless cleaner that uses dirt cup technology. HEPA filtration performance is typically achieved by utilizing a primary cleaning cartridge or by a secondary exhaust. HEPA is an acronym that stands for: "High Efficiency Particulate Air." One method for determining the HEPA rating is by utilizing Test Method IES-RP-CC021.1, which was developed by the Institute of Environmental Sciences. This test method defines HEPA as 99.97% efficiency when tested with a challenge dust or aerosol that are made from particles that are 0.3 micron (11.81 microinches) in diameter. Furthermore, the airflow in which the challenge aerosol is presented to the media is at 5.33 cm./sec. (10.55 ft./min.). Testing is also performed at an increased airflow rate of 8.54 cm./sec. (16.8 ft./min.), which is typical of most vacuum cleaners. The testing of flat sheet material may be performed with a Dioctyl Phthalate (DOP) aerosol on a TSI® 8160 testing device. TSI® is a federally registered trademark of TSI Incorporated, having a mailing address at P.O. Box 64394, St. Paul, Minn. 55164-0394.

There are literally millions of vacuum cleaners on the market that require the use of a vacuum cleaner bag. Although the filtration of standard cellulose paper bags has improved with the combination of a second layer of electrostatically charged or treated meltblown fiber, which increases the efficiency rating from fifteen percent (15%) to thirty-five percent (35%) to around eighty percent (80%) to eighty-five percent (85%), this meltblown fiber bag media still falls far short of HEPA filtration status.

The present invention is directed to overcoming one or more of the problems set forth above.

SUMMARY OF INVENTION

In one aspect of this invention, an improved vacuum bag media is disclosed. This vacuum bag media includes a first layer having an expanded polytetrafluoroethylene membrane and at least one second layer that includes a first component having a first melting point and a second component having a second melting point that is higher than the first melting point, wherein the first layer is attached to the at least one second layer.

In another aspect of this invention, a process for producing vacuum bag media is disclosed. This process includes attaching a first layer having an expanded polytetrafluoroethylene membrane to at least one second layer that includes a first component having a first melting point and a second component having a second melting point that is higher than the first melting point.

These are merely two illustrative aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which:

FIG. 4 is a perspective view of a bicomponent textile fiber that includes both a sheath and a core;

FIG. 5 is a schematic side view of a laminating apparatus for thermobonding the first layer of material with a second layer of material that includes a heated roll and a water-cooled, nip, compression roll associated with the present invention;

FIG. 8 is a graphical representation of filtration efficiency versus air flow for the preferred embodiment that utilizes a first layer of expanded polytetrafluoroethylene with a second layer of cellulose material that is combined with nonwoven textile fibers;

FIG. 9 is a photomicrograph of a preferred embodiment having a second layer of material that includes cellulose material combined with a bicomponent fiber and embossed bond points that is thermobonded to a first layer of expanded polytetrafluoroethylene, which is magnified by a factor of five hundred (500×);

FIG. 10 is a photomicrograph of a first alternative embodiment with a second layer of material that includes a bicomponent, spunbond, nonwoven material with embossed bond points, which is magnified by a factor of twenty (20×);

DETAILED DESCRIPTION OF THE INVENTION

Figure 1:
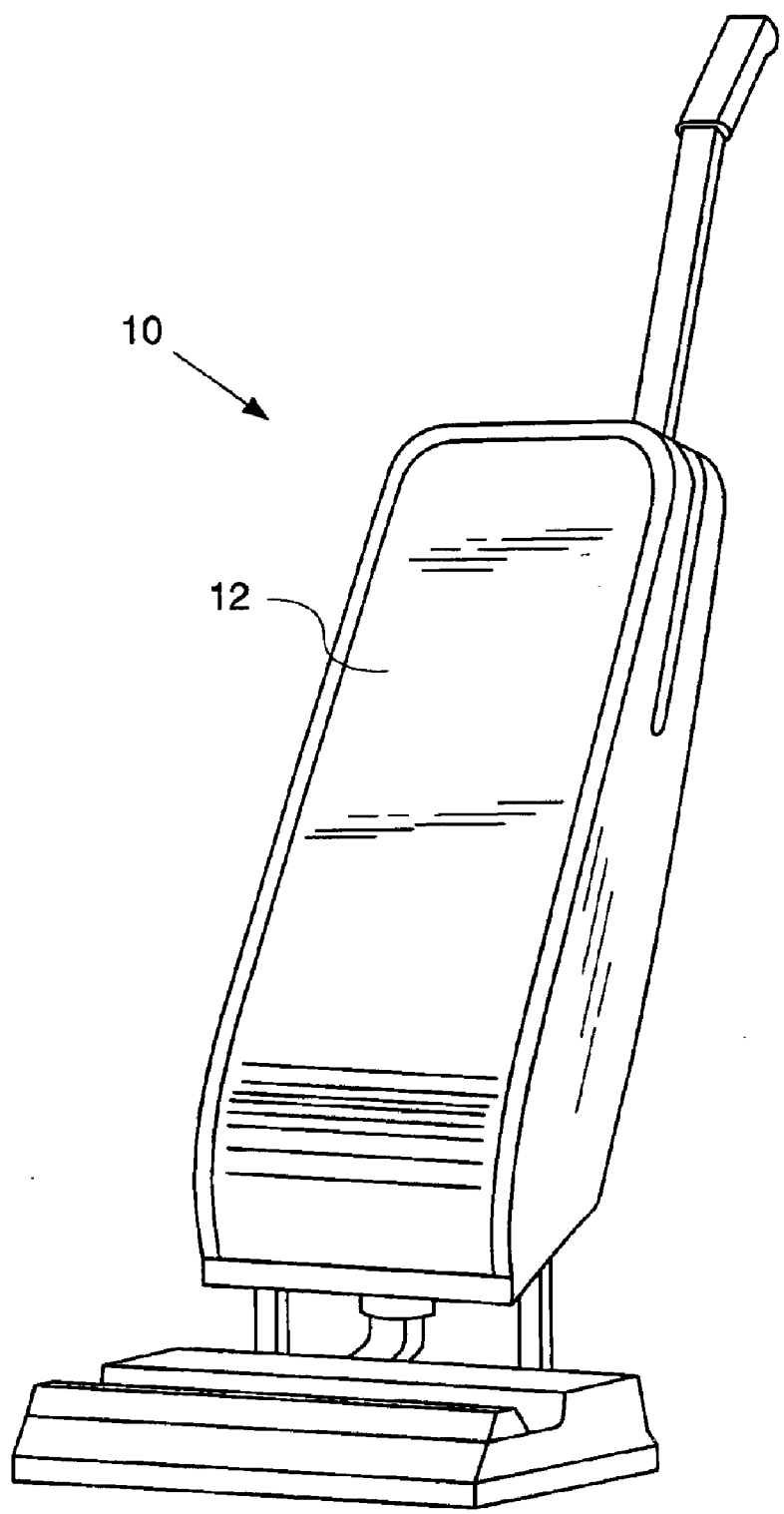
FIG. 1 is a perspective view of an upright vacuum cleaner with a vacuum cleaner bag that utilizes vacuum bag media that is constructed in accordance with the present invention.

Referring now to FIG. 1, although a vacuum cleaner bag can be found in literally any type of vacuum cleaner, one illustrative, but nonlimiting, type of vacuum cleaner is the upright style of vacuum cleaner that is generally indicated by numeral 10. The vacuum cleaner 10 draws in dirt and debris from flooring into a vacuum cleaner bag, which operates as a filter and is generally indicated by numeral 12.

Figure 2:
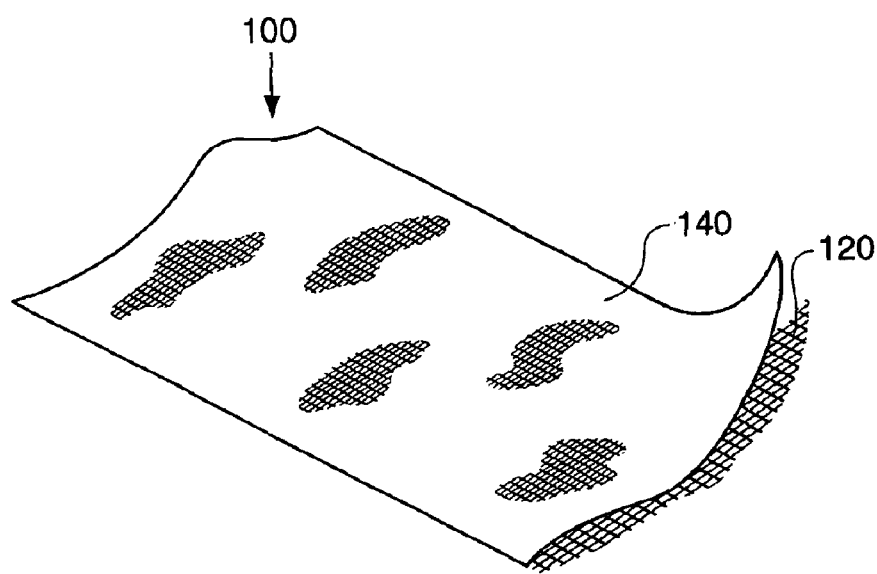
FIG. 2 is a perspective view of a vacuum bag media of the present invention, having a first layer of material, which includes expanded polytetrafluoroethylene and a second layer of material, which includes a first component having a first melting point and a second component having a second melting that is higher than the first melting point.

Referring now to FIG. 2, an improved vacuum cleaner bag 12 of the present invention is formed of vacuum cleaner bag media that has a High Efficiency Particulate Air (HEPA) rating of at least 99.97% efficiency and is generally indicated by numeral 100. The vacuum cleaner bag media 100 includes a first layer of material 120. The first layer of material includes an expanded polytetrafluoroethylene (ePTFE) membrane. The weight of the expanded polytetrafluoroethylene (ePTFE) membrane can vary tremendously.

There is also at least one second layer of material 140. An illustrative, but nonlimiting, example of the preferred second layer of material 140 is a cellulose product, which incorporates additional textile fibers for strength and bonding. This is especially helpful when the second layer of material 140 is subject to damp conditions. A preferred amount of additional textile fibers can range from about 10% to about 40% with a more preferred range from about 15% to about 30% and with the most preferred range from about 15% to about 20% of the second layer of material 140. The type of textile fibers that can be utilized to strengthen the cellulose product can be of literally any type. These textile fibers include but is not limited to: polyester; aramid; polypropylene; polyethylene; viscose rayon; and combinations thereof.

The preferred fiber for use in blending with the cellulose is a bicomponent or hetrofil fiber that uses a core/sheath design. As shown on FIG. 4, a bicomponent fiber 170 includes both a sheath 174 as a first component and a core 172 as a second component. As an illustrative, but nonlimiting example, the sheath 174 can be made of polyethylene with a first melting point, e.g., 130 degrees Celsius (266 degrees Fahrenheit) and the core 172 can be made of polyester with a second melting point, e.g., 255 degrees Celsius to 265 degrees Celsius (491 degrees Fahrenheit to 509 degrees Fahrenheit). The second melting point for polyester depends on the specific polyester polymer utilized. For processing on a paper machine, the fiber length and configuration is important since the fiber needs to be either relatively short, e.g., 625 millimeters (0.25 inches), straight or crimpless for most paper making operations. An example of this type of textile fiber includes a Type 105 manufactured by KoSa®, where KoSa® is a trademark of Arteva B. V., having a place of business at Leidsekade 98 1017 PP Amsterdam, Netherlands as well as having a place of business at 15710 JFK Boulevard, Houston, Tex. 77032.

The first layer of material 120 can be attached to at least one second layer of material 140 by any of wide variety of attachment processes. These attachment processes, as shown in FIG. 5, can include thermobonding. Thermobonding or lamination can involve infrared heat, hot gas and the preferred method that utilizes a hot roll laminating mechanism that includes one heated roll and one water-cooled, nip compression roll. Therefore, as shown in FIG. 5, a laminating operation is generally indicated by numeral 202. This includes a first roll 204 of the first layer of the ePTFE membrane 120 and a second roll 206 of the second layer of material 140. The first and second layers of material 120 and 140 pass through laminating rolls, which are generally indicated by numeral 207. This includes a lower, water-cooled, nip, compression roll 210 and an upper, heated roll 208. The vertical position of the lower, water-cooled, nip, compression roll 210 and an upper, heated roll 208 can be reversed. The preferred material for the upper, heated roll 208 includes steel. A typical pressure applied by the laminating rolls 207 between the lower, water-cooled, nip, compression roll 210 and the upper, heated roll 208 can preferably range from about 0 kilograms per linear millimeter to about 8.93 kilograms per linear millimeter (0 pounds per linear inch to about 500 pounds per linear inch) and more preferably range from about 1.43 kilograms per linear millimeter to about 2.14 kilograms per linear millimeter (80 pounds per linear inch to about 120 pounds per linear inch).

The speed of traverse can preferably range from about 3.05 meters to 30.48 meters per minute (10 feet to about 100 feet per minute). A typical example of a laminating operation 202 of this type is disclosed in U.S. Pat. No. 5,098,777, which issued to Koli on Mar. 24, 1992, which is incorporated herein by reference. The application of speed, temperature and pressure in combination must generate heat that is above the first melting point for the second layer of material 140 and below the higher second melting point for the second layer of material 140. The first layer of material 120 can also be attached to the second layer of material 140 by adhesives. An example of this technology is disclosed in U.S. Pat. No. 5,902,843, which issued to Simon et al. on May 11, 1999, which is incorporated herein by reference. The attachment of the first layer of material 120 to the second layer of material 140 can also be accomplished by the application of ultrasonic energy. An example of this technology is disclosed in U.S. Pat. No. 6,325,127, which issued to Waldrop on Dec. 4, 2001, which is incorporated herein by reference.

The traditional weight for a vacuum cleaner bag paper is approximately 39 pounds (39 pounds per 3,000 square feet) or 0.044 kilograms per square meter (1.85 ounces per square yard). Even with a fifteen percent (15%), a twenty percent (20%) or a thirty percent (30%) blend of fiber to cellulose material, a preferred thickness of 0.1524 millimeters (0.006 inches) with an air permeability of 0.71 cubic meters to 0.99 cubic meters (25 cubic feet to 35 cubic feet) per minute was attained prior to thermobonding or lamination. The preferred thickness of the vacuum bag media 100 can range from 0.0508 millimeters (0.002 inches) to 0.508 millimeters (0.02 inches), however, a great deal of variation is possible.

Figure 7:
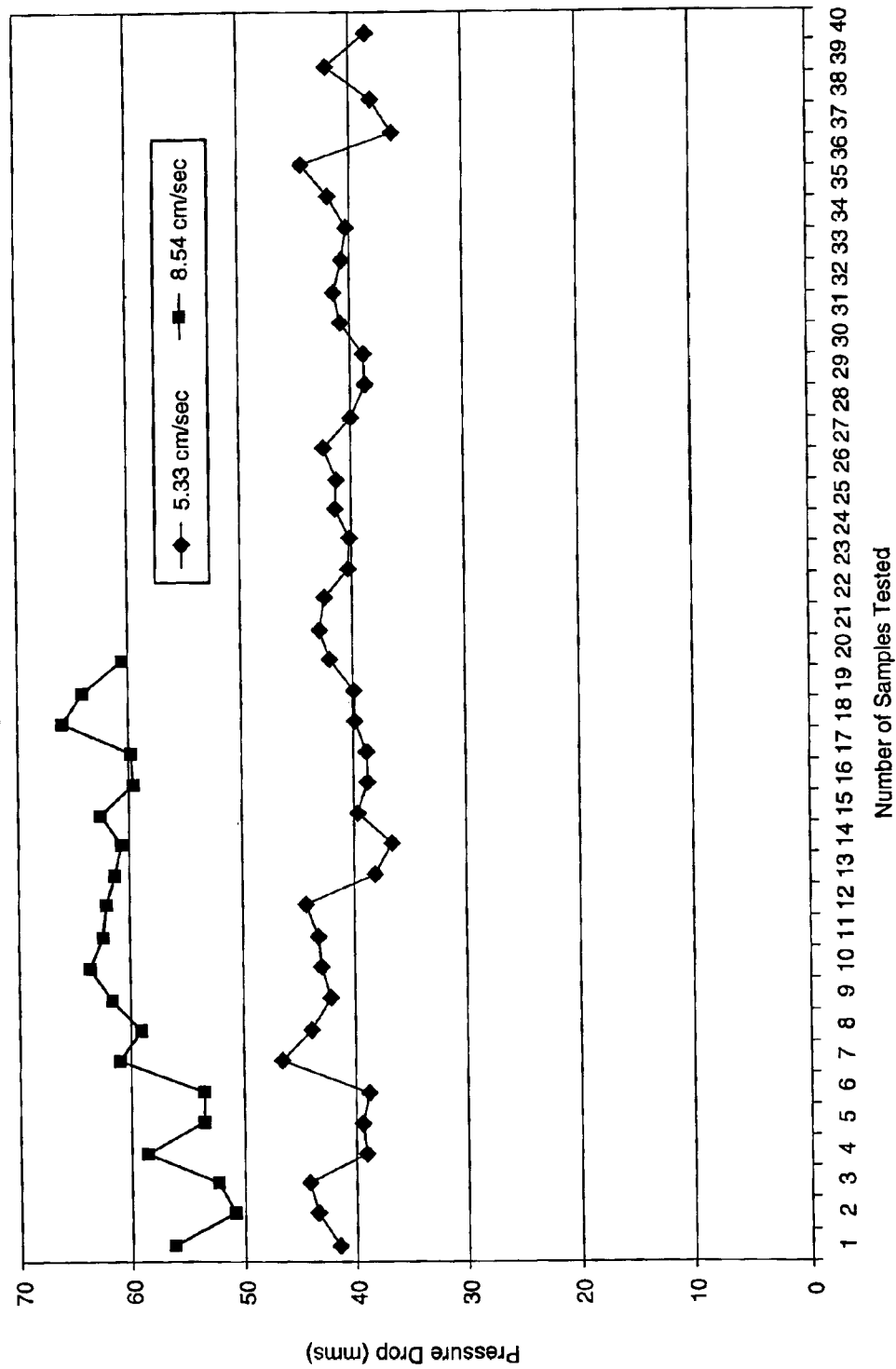
FIG. 7 is a graphical representation of air flow versus pressure drop (resistance) for the preferred embodiment that utilizes a first layer of expanded polytetrafluoroethylene with a second layer of cellulose material that is combined with nonwoven textile fibers.

After thermobonding, as shown in Table 1, the following data for pressure drop (resistance) and filtration efficiency in relationship to air flow at 5.33 cm./sec. (10.49 feet/minute) is obtained and graphically illustrated on FIGS. 7 and 8, respectively. The pressure drop (resistance) was about 40 millimeters (1.57 inches) with the air permeability in the range between 0.113 cubic meters (4.0 cubic feet) to 0.156 cubic meters (5.5 cubic feet) per minute at 0.5 inches of water pressure differential.

TABLE 1

| Efficiency | Pressure Drop (millimeters) | Pressure Drop (inches) |
| --- | --- | --- |
| 99.999 | 41.65 | 1.64 |
| 99.9996 | 43.52 | 1.71 |
| 99.9997 | 44.26 | 1.74 |
| 99.993 | 39.23 | 1.55 |
| 99.999 | 39.49 | 1.56 |
| 99.994 | 38.86 | 1.53 |
| 99.9996 | 46.53 | 1.83 |
| 99.995 | 43.83 | 1.73 |
| 99.9999 | 42.05 | 1.66 |
| 99.9998 | 42.97 | 1.69 |
| 99.9998 | 43.18 | 1.70 |
| 99.997 | 44.27 | 1.74 |
| 99.998 | 38.12 | 1.50 |
| 99.999 | 36.71 | 1.45 |
| 99.993 | 39.54 | 1.56 |
| 99.996 | 38.72 | 1.52 |
| 99.994 | 38.77 | 1.63 |
| 99.996 | 39.66 | 1.56 |
| 99.996 | 39.83 | 1.57 |
| 99.999 | 41.86 | 1.65 |
| 99.998 | 42.8 | 1.69 |
| 99.999 | 42.28 | 1.67 |
| 99.9994 | 40.42 | 1.59 |
| 99.9994 | 40.01 | 1.58 |
| 99.985 | 41.15 | 1.62 |
| 99.998 | 41.16 | 1.62 |
| 99.996 | 42.23 | 1.66 |
| 99.996 | 39.67 | 1.56 |
| 99.998 | 38.49 | 1.52 |
| 99.992 | 38.57 | 1.52 |
| 99.999 | 40.63 | 1.60 |
| 99.996 | 41.13 | 1.62 |
| 99.9991 | 40.49 | 1.59 |
| 99.9996 | 39.99 | 1.57 |
| 99.998 | 41.55 | 1.64 |
| 99.998 | 43.95 | 1.73 |
| 99.9996 | 35.88 | 1.41 |
| 99.998 | 37.68 | 1.48 |
| 99.999 | 41.55 | 1.64 |
| 99.995 | 38.13 | 1.50 |

As shown in Table 2, the following data for pressure drop (resistance) and filtration efficiency in relationship to air flow at 8.54 cm./sec. (16.81 feet/minute), which is the flow rate found in the typical vacuum cleaner 10, is obtained and graphically illustrated on FIGS. 7 and 8, respectively.

TABLE 2

| Efficiency | Pressure Drop (millimeters) | Pressure Drop (inches) |
| --- | --- | --- |
| 99.989 | 56.42 | 2.22 |
| 99.989 | 50.94 | 2.00 |
| 99.99 | 52.48 | 2.07 |
| 99.996 | 58.77 | 2.31 |

TABLE 2-continued

| Efficiency | Pressure Drop (millimeters) | Pressure Drop (inches) |
| --- | --- | --- |
| 99.994 | 53.7 | 2.11 |
| 99.997 | 53.63 | 2.11 |
| 99.997 | 61.24 | 2.41 |
| 99.993 | 59.28 | 2.33 |
| 99.991 | 61.92 | 2.44 |
| 99.9996 | 63.78 | 2.51 |
| 99.999 | 62.62 | 2.47 |
| 99.996 | 62.28 | 2.45 |
| 99.99 | 61.51 | 2.42 |
| 99.996 | 60.92 | 2.40 |
| 99.998 | 62.65 | 2.47 |
| 99.996 | 59.76 | 2.35 |
| 99.994 | 59.89 | 2.36 |
| 99.996 | 66.02 | 2.60 |
| 99.997 | 64.21 | 2.53 |
| 99.993 | 60.59 | 2.39 |

Therefore, the HEPA efficiency rating of 99.97% efficiency was easily obtained. A photomicrograph of the cellulose product utilizing bicomponent fibers that has been magnified five hundred times (500×) is illustrated on FIG. 9. Due to the low adhesion properties and excellent release properties of the vacuum cleaner bag media 100, allows dust to settle in the bottom of the vacuum cleaner bag 12, as shown in FIG. 1, with a minimal increase in resistance. This improves the performance of the vacuum cleaner 10.

A first alternative embodiment, of the second layer of material 140 includes a bicomponent, spunbond, nonwoven material as shown in FIG. 2. An illustrative, but nonlimiting, example of this type of bicomponent, spunbond, nonwoven material includes a polyester/polyethylene based hetrofil fiber filament. One type of polyester/polyethylene based hetrofil fiber filament includes the ELEVES™ spunbond product line produced by UNITIKA®. UNITIKA® is a federally registered trademark of Unitika Kabushiki Kaisha d.b.a. Unitika Ltd., having a place of business at 1–50, HigashiHon-Machi Amagasaki-Shi, Hyogo-ken, Japan. The construction of this bicomponent fiber is a core and sheath design that is generally indicated by numeral 170 on FIG. 4, where the ratio of the core 172, as a second component, to the sheath 174, as a first component, can range from 80% core 172 to 20% sheath 174 to 20% core 172 to 80% sheath 174 with the preferred value being 50% core 172 to 50% sheath 174. The polymer forming the core 172 preferably has a higher melting point than the polymer forming the sheath 174. One illustrative, but nonlimiting, example of polymer that can be utilized for the core 172 is polyester and one illustrative, but nonlimiting example, of the polymer that can be utilized for the sheath 174 is polyethylene. There is a difference in the melting point for the polymer used for the core 172 and the polymer used for the sheath 174 with the sheath 174 being at a first melting point and the core 172 being at a second melting point that is higher than the first melting point. For example, the melting point for polyester is 255 degrees Celsius to 265 degrees Celsius (491 degrees Fahrenheit to 509 degrees Fahrenheit) and the melting point for polyethylene is 130 degrees Celsius (266 degrees Fahrenheit).

The ePTFE membrane 120 that is utilized on the filtration side of the vacuum cleaner bag 12 is regenerable in use due to the low adhesion and excellent release properties. A major advantage of this present invention is the flexibility of this second layer of material 140, which allows this material to fold readily and crease easily to conform to the different shapes required for the vacuum cleaning bag 12, as shown on FIG. 1. Moreover, the thermoplastic qualities of this second layer of material 140 allows for thermobonding, i.e., heat welding, as opposed to utilizing adhesives during the construction of the vacuum cleaner bag 12. Heat welding generally provides a seal that is more impermeable and cleaner than a seal formed by adhesives. In addition, heat welding is generally less expensive than the application of adhesives.

Figure 6:
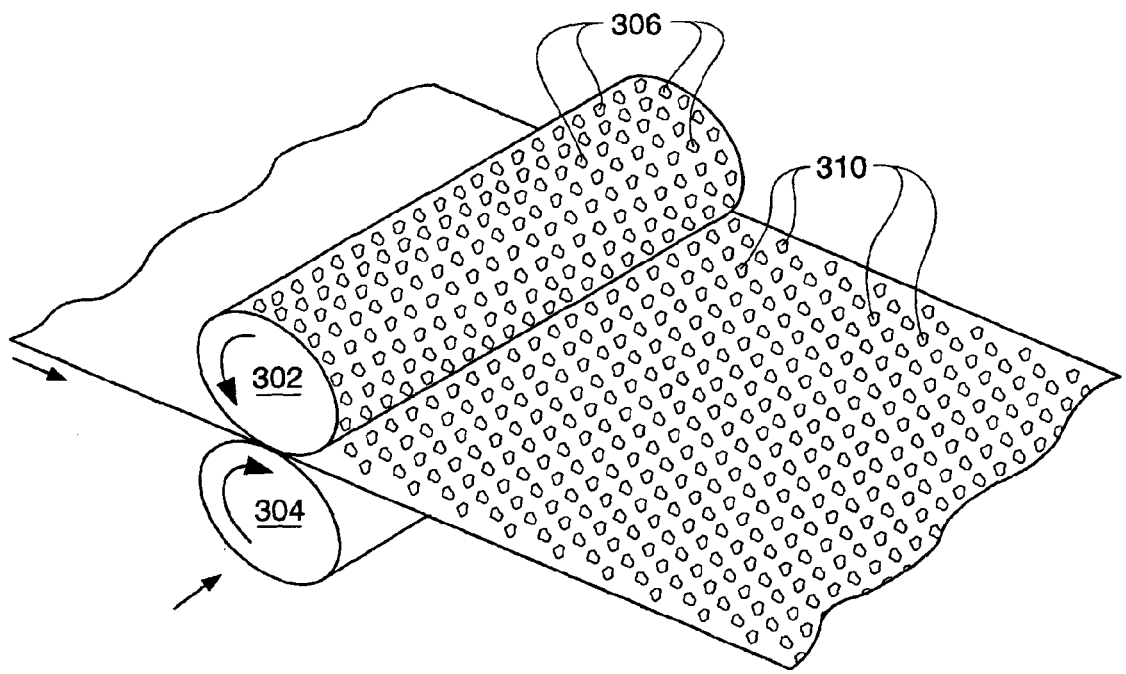
FIG. 6 is a schematic side view of an embossed calendering apparatus for creating nonwoven fabric utilized with the second layer of material associated with the present invention.
Figure 11:
FIG. 11 is a photomicrograph of a first alternative embodiment with a second layer of material that includes a bicomponent, spunbond, nonwoven material with embossed bond points, which is magnified by a factor of one thousand (1,000×)
Figure 12:
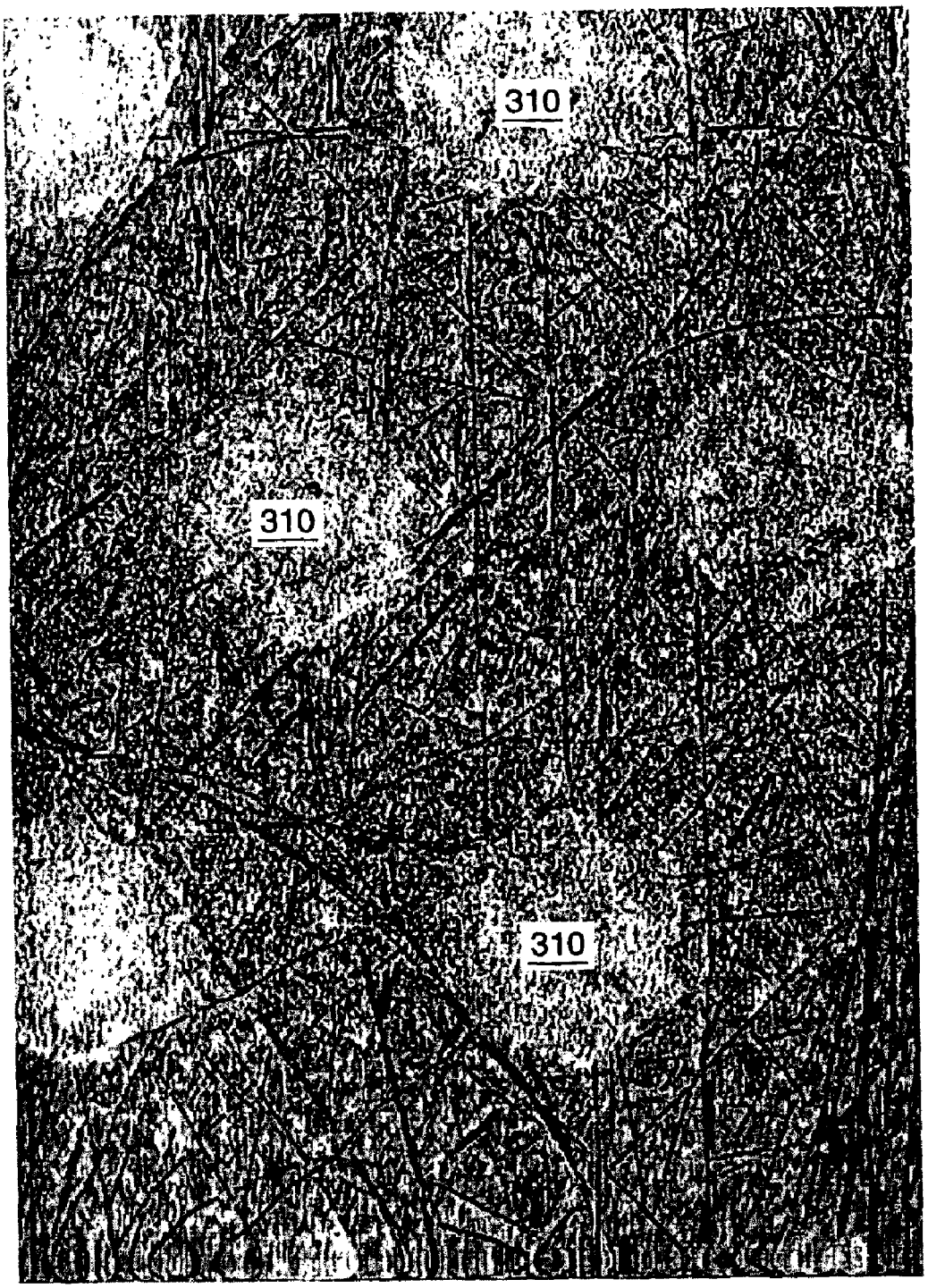
FIG. 12 is a photomicrograph of a first alternative embodiment with a second layer of material that includes a bicomponent, spunbond, nonwoven material with embossed bond points that is thermobonded to a first layer of expanded polytetrafluoroethylene, which is magnified by a factor of twenty (20×)
Figure 13:
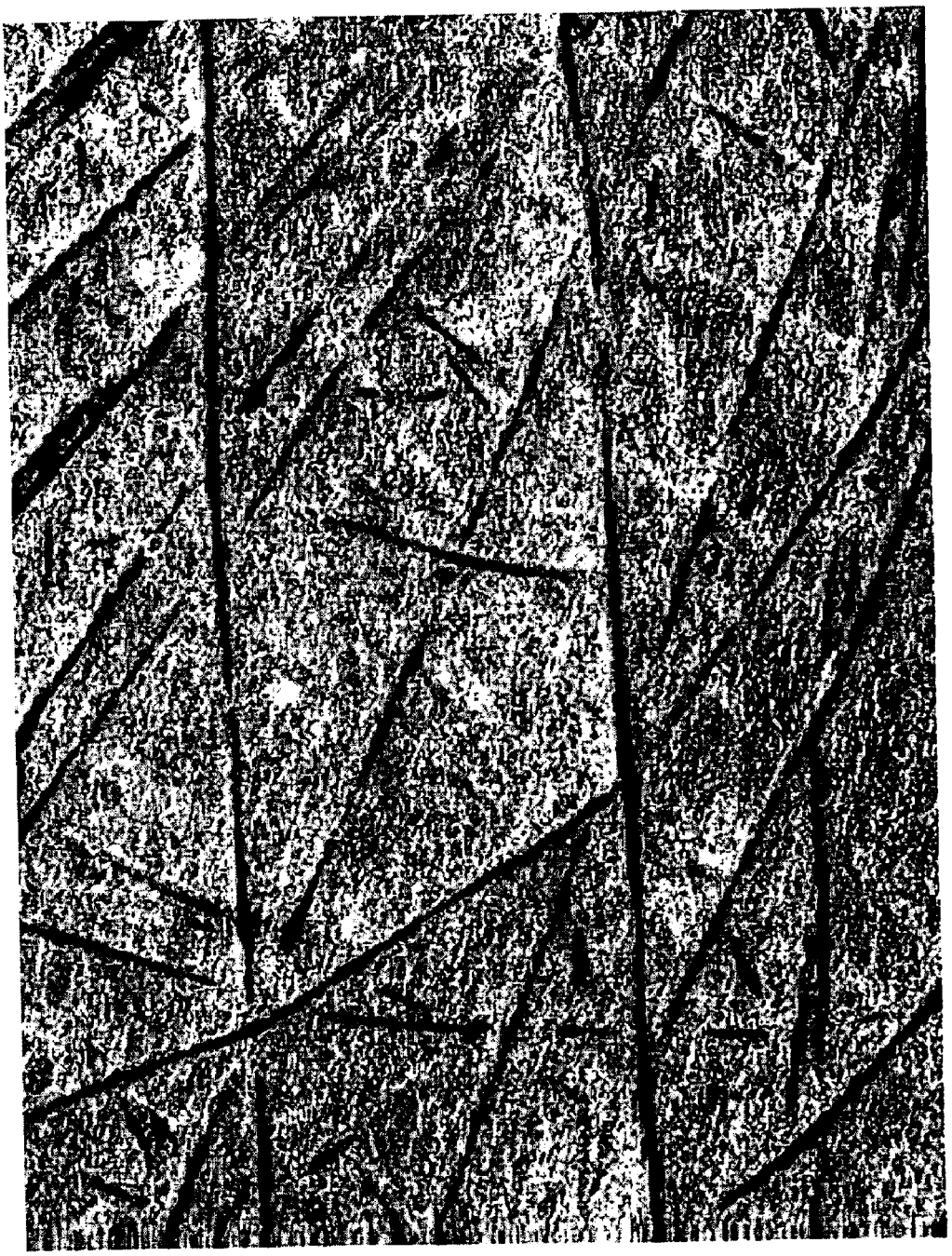
FIG. 13 is a photomicrograph of a first second alternative embodiment with a second layer of material that includes a bicomponent, spunbond, nonwoven material with embossed bond points that is thermobonded to a first layer of expanded polytetrafluoroethylene, which is magnified by a factor of one hundred (100×).

The flexibility of the bicomponent, spunbond, nonwoven material that forms the second layer of material 140 is derived from a consolidated process since spunbond media is traditionally consolidated by smooth calender rolls. Due to the fact that the bicomponent, spunbond, nonwoven material is thermally consolidated, an increased level of stiffness will result since most of the lower melting point polymers (first components or sheaths 174) will melt. Therefore, as shown in FIG. 6, there is an upper calender roll 302 and a lower calender roll 304. Preferably, at least one of the calender rolls 302, 304 is embossed with protrusions 306. This provides for the melting of only a select portion of the first component having the lower melting point. This can range from about 5% to about 40%, and preferably can range from about 15% to about 25% and most preferably can range from about 18% to about 20%. An example of this second layer of material 140 that is selectively melted is found on the FIG. 10 by a series of bond points 310. All of the lower melting point (first component or sheath 174) material within the bond points 310 will melt. FIGS. 10 and 11 are photomicrographs of the bicomponent, spunbond, nonwoven material, where the bicomponent, spunbond, nonwoven material has been magnified twenty times (20×) and one thousand times (1,000×), respectively. This embossed spunbond material forming this second layer of material 140 has a higher air permeability than flat bonded media of the same basis weight and fiber denier. A typical example of a calender of this type for forming nonwoven fabric includes that disclosed in U.S. Pat. No. 4,605,366, which issued to Lehmann et al. on Aug. 12, 1986, which is incorporated herein by reference.

The first layer of material 120 can be attached to at least one second layer of material 140 by any of wide variety of attachment processes. These attachment processes, as shown in FIG. 5, can include thermobonding. Thermobonding or lamination can involve infrared heat, hot gas and the preferred method that utilizes a hot roll laminating mechanism that includes one heated roll and one water-cooled, nip compression roll. Therefore, as shown in FIG. 5, a laminating operation is generally indicated by numeral 202. This includes a first roll 204 of the first layer of the ePTFE membrane 120 and a second roll 206 of the second layer of material 140. The first and second layers of material 120 and 140 pass through laminating rolls, which are generally indicated by numeral 207. This includes a lower, water-cooled, nip, compression roll 210 and an upper, heated roll 208. The vertical position of the lower, water-cooled, nip, compression roll 210 and an upper, heated roll 208 can be reversed. The preferred material for the upper, heated roll 208 includes steel. A typical pressure applied by the laminating rolls 207 between the lower, water-cooled, nip, compression roll 210 and the upper, heated roll 208 can preferably range from about 0 kilograms per linear millimeter to about 8.93 kilograms per linear millimeter (0 pounds per linear inch to about 500 pounds per linear inch) and more preferably range from about 1.43 kilograms per linear millimeter to about 2.14 kilograms per linear millimeter (80 pounds per linear inch to about 120 pounds per linear inch).

The speed of traverse can preferably range from about 3.05 meters to 30.48 meters per minute (10 feet to about 100 feet per minute). A typical example of a laminating operation 202 of this type is disclosed in U.S. Pat. No. 5,098,777, which issued to Koli on Mar. 24, 1992, which is incorporated herein by reference. The application of speed, temperature and pressure combination must generate heat that is above the first melting point for the second layer of material 140 and below the higher second melting point for the second layer of material 140. The first layer of material 120 can also be attached to the second layer of material 140 by adhesives. An example of this technology is disclosed in U.S. Pat. No. 5,902,843, which issued to Simon et al. on May 11, 1999, which is incorporated herein by reference. The attachment of the first layer of material 120 to the second layer of material 140 can also be accomplished by the application of ultrasonic energy. An example of this technology is disclosed in U.S. Pat. No. 6,325,127, which issued to Waldrop on Dec. 4, 2001, which is incorporated herein by reference.

Testing of the airflow in which the challenge aerosol is presented to the media is at 5.33 cm./sec. (10.55 ft./min) and was performed with a Dioctyl Phthalate (DOP) aerosol on a TSI 8160 testing device with a 0.3 micron (11.81 microinch) particle size for one hundred percent (100%) of the particles. The pressure drop (resistance) was between 30 millimeters to 40 millimeters (1.18 inches to 1.58 inches). The air permeability normally ranges between about 0.113 cubic meter (4 cubic feet) per minute to about 0.227 cubic meters (8 cubic feet) per minute at a 12.7 millimeter (0.5 inch) water pressure differential. The HEPA efficiency rating surpassed 99.97%. FIGS. 12 and 13 are photomicrographs of the bicomponent, spunbond, nonwoven material of the second layer of material 140 that has been thermobonded to the first layer of ePTFE membrane material 120, which has been magnified by a factor of twenty (20×) and one hundred (100X), respectively. The preferred, but nonlimiting, weight of the second layer of material 140, prior to thermobonding, can range from about 11.85 grams per square meter (0.5 ounces per square yard) to about 142.2 grams per square meter (6 ounces per square yard) with an optimal value of 47.4 grams per square meter (2 ounces per square yard).

A second alternative embodiment, of the second layer of material 140 includes a bicomponent, carded, thermal bonded, nonwoven material as shown in FIG. 2. Therefore, theoretically but not necessarily, all fibers could be of the same type and size. This material process provides for a customization of the properties to maximize air flow and minimize the increase in pressure drop, which is otherwise known as resistance. There are a myriad of core and sheath bicomponent fibers that can be utilized to create the blended, thermal bond, nonwoven material 140. This includes virtually any type of polymer fiber. This includes a first component, e.g., polymer, having a first melting point and a second component, e.g., polymer, having a higher melting point that is higher than the first melting point. Examples of these types of fibers that have differing melting points include polyester, polypropylene, polyethylene, nylon and mixtures thereof, among others, as well as the same type of polymer with different melting points such as polyester.

The bicomponent fibers can range from about 5% to about 40%, and preferably can range from about 15% to about 25% and most preferably can range from about 18% to about 20% of the second layer of material 140. The remaining fiber can be of another type of fiber, e.g., polymer fiber. An illustrative, but nonlimiting, example of another polymer could include polyester fibers. This other polymer would have a higher melting point than the first or lower melting point. An illustrative, but nonlimiting, example would include 20% bicomponent, polyester/polypropylene fibers and 80% standard polyester fiber. As shown in FIG. 4, an example of this type of bicomponent fiber 170 includes a polyester core 172 and a polyethylene sheath 174 such as Type 225 manufactured by KoSa®, where KoSa® is a trademark of Arteva B.V., having a place of business at Leidsekade 98 1017 PP Amsterdam, Netherlands as well as having a place of business at 15710 JFK Boulevard, Houston, Tex. 77032. In this illustrative, but nonlimiting, example, a 67.75 grams/ square meter (2.0 oz./sq. yd.) media is produced. A supplier that can produce this media through carding and thermal bonding is Bondex Inc., having a place of business at 2 Maxwell Drive, Trenton, S.C. 29847.

The flexibility of the bicomponent, thermal bond, nonwoven material that forms the second layer of material 140 is derived from a consolidated process since thermal bond nonwoven media is traditionally consolidated by smooth calender rolls. Due to the fact that the bicomponent, thermal bond, nonwoven material is thermally consolidated, an increased level of stiffness will result since most of the lower melting point fibers will melt. However, since there are fibers other than the bicomponent fibers 170 present in this second alternative embodiment, greater air flow results since a much lower percentage of the fibers will melt. This second alternative embodiment is superior to the first alternative embodiment since the ratio of bicomponent fibers 170 to other fibers that have a higher melting point can be selected to achieve a desired air flow. As shown in FIG. 6, the bicomponent, thermal bond, nonwoven material is processed with an upper calender roll 302 and a lower calender roll 304. Preferably, at least one of the calender rolls 302, 304 is embossed with protrusions 306. This provides for the melting of only a select portion of the first component material having the lower melting point that is present at the protrusions 306. This can range from about 5% to about 40%, and preferably can range from about 15% to about 25% and most preferably can range from about 18% to about 20% of the first component. A typical example of a calender of this type for forming nonwoven fabric includes that disclosed in U.S. Pat. No. 4,605,366, which issued to Lehmann et al. on Aug. 12, 1986, which is incorporated herein by reference. Due to the nature of this bicomponent, thermal bonded, nonwoven material forming the second layer of material 140, in the preferred illustrative, but nonlimiting embodiment, there are approximately twenty percent (20%) less bonding sites in comparison of the spun bond, nonwoven material in the first alternative embodiment. This provides for less of the first layer of ePTFE material 120 from being melted and blocked, which results in greater airflow and more filtration.

The first layer of material 120 can be attached to at least one second layer of material 140 by any of wide variety of attachment processes. These attachment processes, as shown in FIG. 5, can include thermobonding. Thermobonding or lamination can involve infrared heat, hot gas and the preferred method that utilizes a hot roll laminating mechanism that includes one heated roll and one water-cooled, nip compression roll. Therefore, as shown in FIG. 5, a laminating operation is generally indicated by numeral 202. This includes a first roll 204 of the first layer of the ePTFE membrane 120 and a second roll 206 of the second layer of material 140. The first and second layers of material 120 and 140 pass through laminating rolls, which are generally indicated by numeral 207. This includes a lower, water-cooled, nip, compression roll 210 and an upper, heated roll 208. The vertical position of the lower, water-cooled, nip, compression roll 210 and an upper, heated roll 208 can be reversed. The preferred material for the upper, heated roll 208 includes steel. A typical pressure applied by the laminating rolls 207 between the lower, water-cooled, nip, compression roll 210 and the upper, heated roll 208 can preferably range from about 0 kilograms per linear millimeter to about 8.93 kilograms per linear millimeter (0 pounds per linear inch to about 500 pounds per linear inch) and more preferably range from about 1.43 kilograms per linear millimeter to about 2.14 kilograms per linear millimeter (80 pounds per linear inch to about 120 pounds per linear inch).

The speed of traverse can preferably range from about 3.05 meters to 30.48 meters per minute (10 feet to about 100 feet per minute). A typical example of a laminating operation 202 of this type is disclosed in U.S. Pat. No. 5,098,777, which issued to Koli on Mar. 24, 1992, which is incorporated herein by reference. The application of speed, temperature and pressure in combination must generate heat that is above the first melting point for the second layer of material 140 and below the higher second melting point for the second layer of material 140. The first layer of material 120 can also be attached to the second layer of material 140 by adhesives. An example of this technology is disclosed in U.S. Pat. No. 5,902,843, which issued to Simon et al. on May 11, 1999, which is incorporated herein by reference. The attachment of the first layer of material 120 to the second layer of material 140 can also be accomplished by the application of ultrasonic energy. An example of this technology is disclosed in U.S. Pat. No. 6,325,127, which issued to Waldrop on Dec. 4, 2001, which is incorporated herein by reference.

Testing of the airflow in which the challenge aerosol is presented to the vacuum bag media 100 is at 5.33 cm./sec. (10.55 ft./min) and was performed with a Dioctyl Phthalate (DOP) aerosol on a TSI 8160 testing device with a 0.3 micron (11.81 microinch) particle size for one hundred percent (100%) of the particles. The pressure drop (resistance) was between 20 millimeters to 28 millimeters (0.787 inches to 1.10 inches). The air permeability normally ranges between about 0.141 cubic meter (5 cubic feet) per minute to about 0.255 cubic meter (9 cubic feet) per minute at a 12.7 millimeter (0.5 inch) water pressure differential. The HEPA efficiency rating surpassed 99.97%. The weight of the second layer of material 140, prior to thermobonding, can preferably range from about 11.85 grams per square meter (0.5 ounces per square yard) to about 142.2 grams per square meter (6 ounces per square yard) with a preferred value of 47.4 grams per square meter (2 ounces per square yard).

Figure 3:
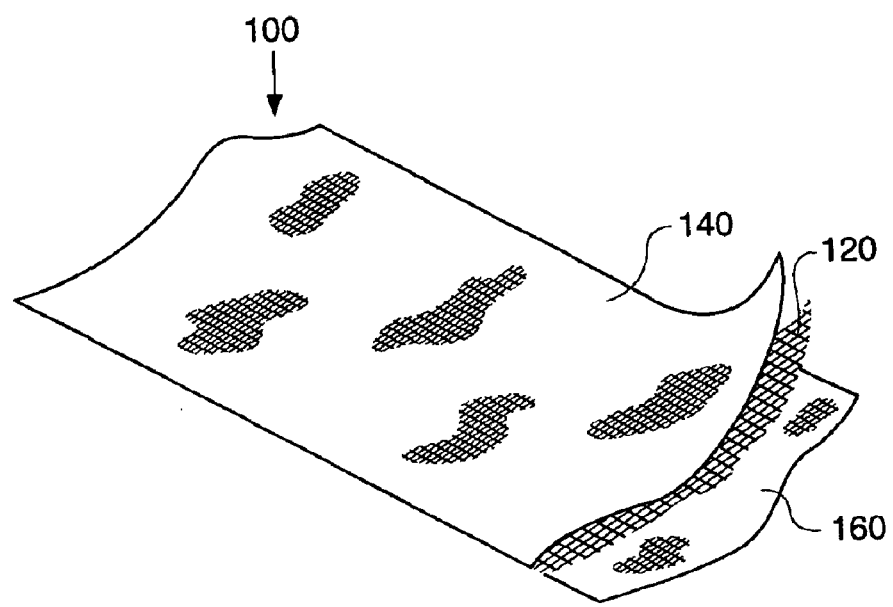
FIG. 3 is a perspective view of a vacuum bag media of the present invention as shown in FIG. 2, which includes another protective layer of textile material positioned on the other side of the first layer of expanded polytetrafluoroethylene material.

A third alternative embodiment includes a third layer of material 160 in addition to the second layer of material 140. This third layer of material 160 can include a wide variety of textile material and fabric, as shown in FIG. 3. As previously described above, the second layer of material can include cellulose material, spunbond, nonwoven material and fiber blended, thermal bonded nonwoven material. The third layer of material 160 is typically very light weight and in a preferred range from about 9.48 grams per square meter (0.4 ounces per square yard) to about 23.70 grams per square meter (1.0 ounces per square yard). This third layer of material 160 is very open fabric that provides a high degree of air flow. This third layer of material 160 is designed to protect the first layer of material 120 from projectiles within the vacuum cleaner bag 12 that have been suctioned by the vacuum cleaner. In addition, abrasion can also be caused by metal formers, feed rolls and guide plates during the manufacturing process. This damage to the first layer of ePTFE material 120 can result in less than HEPA efficiency. This third layer of material 160 can provide the structural integrity to the vacuum bag media 100 while preserving a HEPA efficiency rating that surpasses 99.97%. This third layer of material 160 can be attached to the other side of the first layer of material 120 in the same manner as the second layer of material 140, as previously described above.

An illustrative, but nonlimiting, example of this type of fabric can include, but is not limited to, a thermal bonded nonwoven produced by PGI Nonwovens, having a place of business at 10 Panasonic Way, Mooresville, N.C. 28115. This technology utilizes carded, dry laid technology with a flat bond finish.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A vacuum bag media comprising:
 a first layer that includes an expanded polytetrafluoroethylene membrane; and
 at least one second layer that includes a first material of bicomponent fibers with a first portion having a first melting point and a second portion having a second melting point that is higher than the first melting point, and a second material having a third melting point that is higher than the first melting point, wherein the first material and the second material are blended together and the first portion of the bicomponent fibers is melted to attach the first layer to the at least one second layer.

2. The vacuum bag media according to claim 1, wherein the second material includes cellulose.

3. The vacuum bag media according to claim 1, wherein the at least one second layer includes a spunbond, nonwoven fabric.

4. The vacuum bag media according to claim 1, wherein the at least one second layer includes a thermal bond, nonwoven fabric.

5. The vacuum bag media according to claim 1, wherein the first material of the bicomponent fibers is in a range from about 5% to about 40% by weight of the second layer.

6. The vacuum bag media according to claim 1, wherein the first portion includes at least one fiber sheath and the second portion includes at least one fiber core.

7. The vacuum bag media according to claim 6, wherein at least 10% of the first portion includes the at least one fiber sheath.

8. The vacuum bag media according to claim 3, wherein the first portion includes polyethylene and the second portion includes polyester.

9. The vacuum bag media according to claim 4, wherein the first portion is selected from the group consisting of polyester, polypropylene, polyethylene, nylon and mixtures thereof and the second portion is selected from the group consisting of polyester, polypropylene, polyethylene, nylon and mixtures thereof.

10. The vacuum bag media according to claim 2, wherein the second material includes, in addition to the cellulose material, a fiber selected from the group consisting of polyester, aramid, polypropylene, polyethylene, viscose rayon and combinations thereof.

11. A vacuum bag media comprising:
 a first layer that includes an expanded polytetrafluoroethylene membrane; and
 at least one second layer that includes a first material of bicomponent fibers with a first portion having a first melting point and a second portion having a second melting point that is higher than the first melting point, and a second material having a third melting point that is higher than the first melting point, wherein the first material and the second material are blended together and the first portion of the bicomponent fibers is at least partially melted to attach the first layer to the at least one second layer and the first material of the bicomponent fibers is in a range from about 5% to about 40% by weight of the second layer.

12. A vacuum bag media comprising:
 a first layer, having a first side and a second side, that includes an expanded polytetrafluoroethylene membrane;
 a second layer that includes a first material of bicomponent fibers with a first portion having a first melting point and a second portion having a second melting point that is higher than the first melting point, and a second material having a third melting point that is higher than the first melting point, wherein the first material and the second material are blended together and the first portion of the bicomponent fibers is melted to attach the second layer to the first side of the first layer; and
 a third layer that includes a nonwoven fabric, which is attached to the second side of the first layer.

13. A process for producing vacuum bag media comprising:
 attaching a first layer that includes an expanded polytetrafluoroethylene membrane to at least one second layer that includes a first material of bicomponent fibers with a first portion having a first melting point and a second portion having a second melting point that is higher than the first melting point, and a second material having a third melting point that is higher than the first melting point, wherein the first material and the second material are blended together and the first layer is attached to the at least one second layer by melting the first portion of the bicomponent fibers to the at least one second layer.

14. The process for producing vacuum bag media according to claim 13, wherein the attaching of the first layer to the at least one second layer includes thermobonding.

15. The process for producing vacuum bag media according to claim 14, wherein the thermobonding of the first layer to the at least one second layer includes using one heated roll and one cooled roll.

16. The process for producing vacuum bag media according to claim 13, wherein the thermobonding of the first layer to the at least one second layer includes applying infrared heat.

17. The process for producing vacuum bag media according to claim 13, wherein the thermobonding of the first layer to the at least one second layer includes applying heated gas.

18. The process for producing vacuum bag media according to claim 13, wherein the attaching of the first layer to the at least one second layer includes applying ultrasonic energy.

19. A process for producing vacuum bag media comprising:
 attaching a first layer that includes an expanded polytetrafluoroethylene membrane to at least one second layer that includes a first material of bicomponent fibers with a first portion having a first melting point and a second portion having a second melting point that is higher than the first melting point, and a second material having a third melting point that is higher than the first melting point, wherein the first material and the second material are blended together and the first layer is attached to the at least one second layer by at least partially melting the first portion of the bicomponent fibers in the at least one second layer and the at least one second layer is selected from the group consisting of cellulose material, spunbond, nonwoven fabric, and a thermal bond, nonwoven fabric.

20. The process for producing vacuum bag media according to claim 19, wherein the first material of the bicomponent fibers is in a range from about 5% to about 40% by weight of the second layer.

21. A vacuum bag media comprising:
a first layer that includes an expanded polytetrafluoroethylene membrane for surface filtration;
at least one second layer, having a first side and a second side, that includes a first material of bicomponent fibers with a first portion having a first melting point and a second portion having a second melting point that is higher than the first melting point, wherein the first material is positioned between the first layer and the second material are blended together and the first portion of the bicomponent fibers is melted to attach the first layer to the first side of the at least one second layer; and
a third layer that includes a second material having a third melting point that is higher than the first melting point selected from the group consisting of textile material and fabric, which is attached to the second side of the at least one second layer.

22. The vacuum bag media according to claim 21, wherein the second material includes cellulose.

23. The vacuum bag media according to claim 21, wherein the at least one second layer includes a spunbond, nonwoven fabric.

24. The vacuum bag media according to claim 21, wherein the at least one second layer includes a thermal bond, nonwoven fabric.

25. The vacuum bag media according to claim 21, wherein the first material of the bicomponent fibers is in a range from about 5% to about 40% by weight of the second layer.

26. The vacuum bag media according to claim 21, wherein the first portion includes at least one fiber sheath and the second portion includes at least one fiber core.

27. The vacuum bag media according to claim 26, wherein at least 10% of the first portion includes the at least one fiber sheath.

28. The vacuum bag media according to claim 23, wherein the first portion includes polyethylene and the second portion includes polyester.

29. The vacuum bag media according to claim 24, wherein the first portion is selected from the group consisting of polyester, polypropylene, polyethylene, nylon and mixtures thereof and the second portion is selected from the group consisting of polyester, polypropylene, polyethylene, nylon and mixtures thereof.

30. The vacuum bag media according to claim 22, wherein the second material includes, in addition to the cellulose material, a fiber selected from the group consisting of polyester, aramid, polypropylene, polyethylene, viscose rayon and combinations thereof.

31. A vacuum bag media comprising:
a first layer, having a first side and a second side, that includes an expanded polytetrafluoroethylene membrane;
a second layer that includes a first material of bicomponent fibers with a first portion having a first melting point and a second portion having a second melting point that is higher than the first melting point, and a second material having a third melting point that is higher than the first melting point, wherein the first material and the second material are blended together and the first portion of the bicomponent fibers of the second layer is melted to attach the second layer to the first side of the first layer; and
a third layer that includes a fabric component, which is disposed adjacent to the second side of the first layer.

32. A vacuum bag comprising of a closed receptacle for collecting dirt particles and having an inlet opening for allowing a dirt laden airstream to enter, said closed receptacle being formed from a composite sheet comprised of at least one layer of expanded polytetrafluoroethylene and at least one substrate layer, wherein said closed receptacle is air permeable and has at least a HEPA filtration rating and wherein said at least one substrate layer includes a first material of bicomponent fibers with a first portion having a first melting point and a second portion having a second melting point that is higher than the first melting point, and a second material having a third melting point that is higher than the first melting point, wherein the first material and the second material are blended together and the first portion of the bicomponent fibers is at least partially melted to attach said layer of expanded polytetrafluoroethylene to said at least one substrate layer.

33. The vacuum bag of claim 32, wherein the at least one substrate layer includes bicomponent fibers in a range from about 5% to about 40% by weight of the at least one substrate layer.

34. A vacuum bag comprising a closed receptacle for collecting dirt particles and having an inlet opening for allowing a dirt laden airstream to enter, said receptacle being formed from a composite sheet comprised of at least one layer of expanded polytetrafluoroethylene and at least one substrate layer, wherein said closed receptacle is air permeable and has at least a HEPA filtration rating and said at least one substrate layer includes a first material of bicomponent fibers with a first portion having a first melting point and a second portion having a second melting point that is higher than the first melting point, and a second material having a third melting point that is higher than the first melting point, wherein said first material and said second material are blended together and the first portion of the bicomponent fibers is melted to attach said at least one substrate layer to said at least one layer of expanded polytetrafluoroethylene.

35. The vacuum bag of claim 34, wherein the at least one substrate layer includes bicomponent fibers in a range from about 5% to about 40% by weight of the at least one substrate layer.

* * * * *